United States Patent [19]

Coggins

[11] 4,287,060
[45] Sep. 1, 1981

[54] AERATION SYSTEM FOR SOLID BIOLOGICAL WASTE

[75] Inventor: Everett W. Coggins, Hopedale, Ill.

[73] Assignee: Confinement Investors, Inc., Hopedale, Ill.

[21] Appl. No.: 113,785

[22] Filed: Jan. 21, 1980

Related U.S. Application Data

[63] Continuation of Ser. No. 943,743, Sep. 19, 1978, abandoned.

[51] Int. Cl.³ .............................. C02F 3/02; B01F 3/04
[52] U.S. Cl. .................................. 210/194; 210/219; 210/242.2; 261/120
[58] Field of Search .................. 210/14, 15, 194, 219, 210/220, 221 R, 242 A; 261/120, 121 R

[56] References Cited

U.S. PATENT DOCUMENTS

| 1,900,809 | 3/1933 | Hammerly | 210/194 |
|---|---|---|---|
| 2,048,640 | 7/1936 | Sperry | 210/14 |
| 2,825,541 | 3/1958 | Moll et al. | 261/DIG. 47 |
| 3,206,176 | 9/1965 | Peterson | 210/14 X |
| 3,365,178 | 1/1968 | Bood | 261/121 X |
| 3,595,538 | 7/1971 | Baumann | 261/120 X |
| 3,709,470 | 1/1973 | Auler et al. | 210/242 A X |
| 3,778,233 | 12/1973 | Blough et al. | 261/121 R X |
| 3,837,627 | 9/1974 | Sence et al. | 210/242 A X |
| 3,840,457 | 10/1974 | Wilson | 210/14 |
| 3,846,516 | 11/1974 | Carlson | 210/242 A X |

Primary Examiner—Robert H. Spitzer
Attorney, Agent, or Firm—Harvey B. Jacobson

[57] ABSTRACT

An aeration system for treating solid biological waste, and the like, has a fluid circulating device disposable in a tank holding a slurry of solid and liquid to be treated for drawing air and slurry from a surface portion of the slurry in the tank and discharging the air and slurry adjacent the bottom of the tank. The circulation device has a propeller pump disposed in a duct having an inlet and an outlet forming the fluid path through the slurry, with a float assembly being connected to the duct adjacent the inlet thereof for positioning the inlet adjacent the surface of the slurry in which the duct is immersed.

5 Claims, 6 Drawing Figures

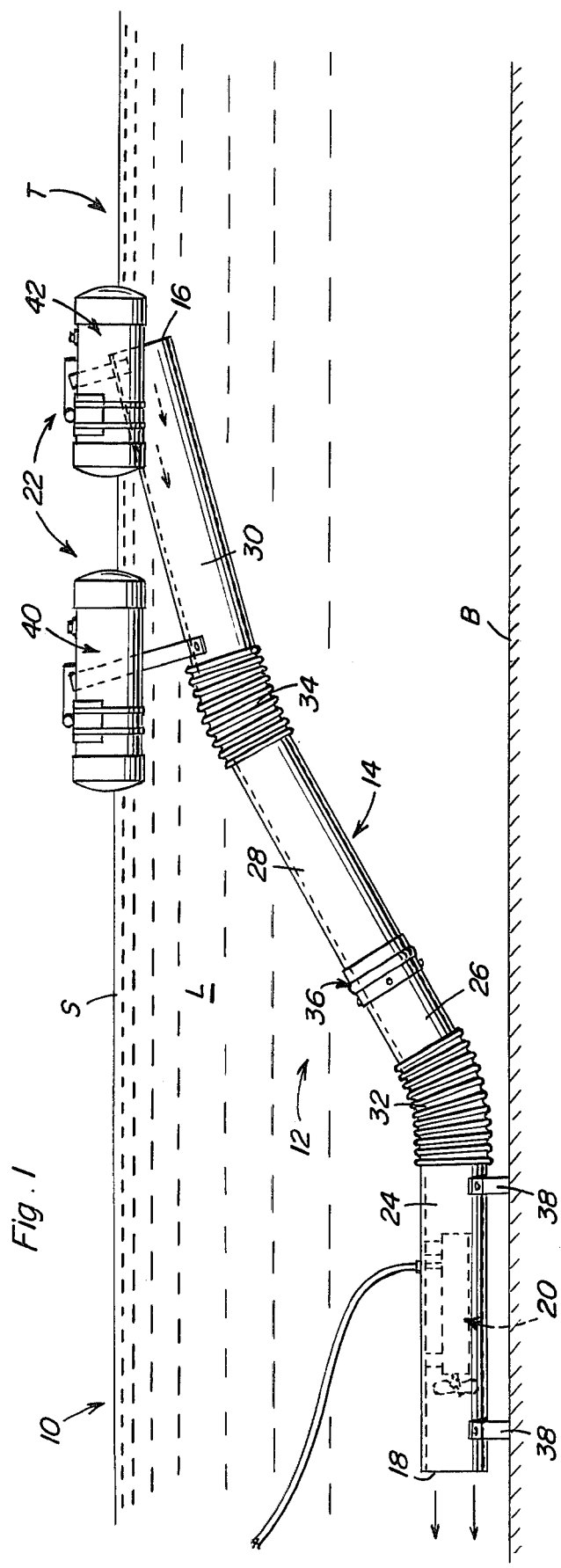
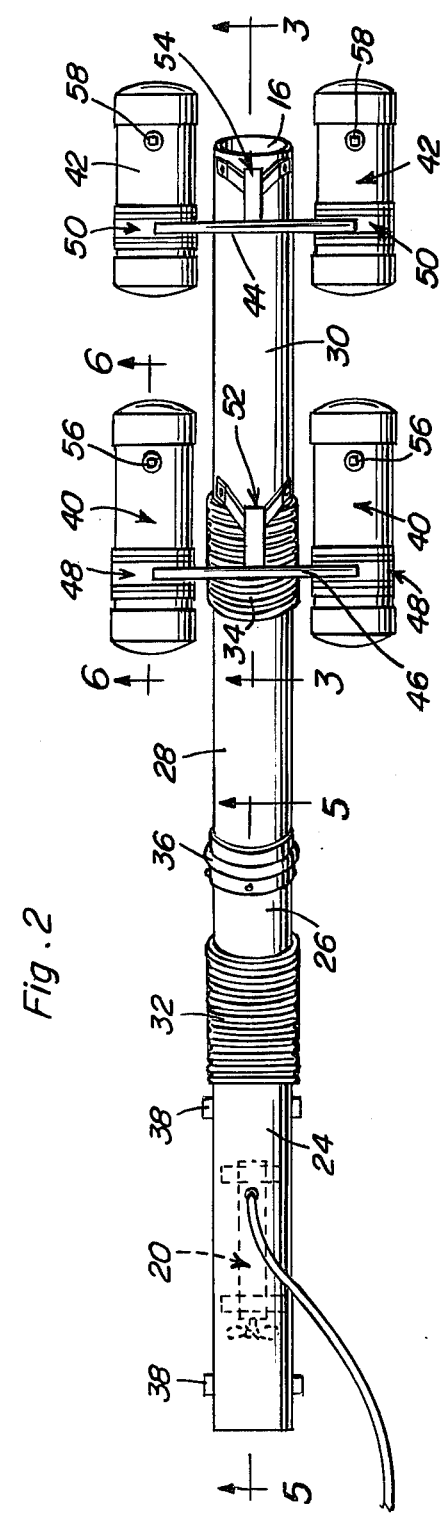
Fig. 1
Fig. 2

AERATION SYSTEM FOR SOLID BIOLOGICAL WASTE

This is a continuation of application Ser. No. 943,743, filed Sept. 19, 1978 and now abandoned.

BACKGROUND OF THE INVENTION

1. Field of the Invention

This invention relates generally to the treatment of biological waste, and the like, and particularly to a system which circulates surface air and waste into the body of manure storage for removing odors and toxic and noxious gases therefrom in order to make handling of the manure a more pleasant task.

2. Description of the Prior Art

There are two types of organisms or bacteria present in fresh manure, aerobic organisms and anaerobic organisms. The anaerobic organisms grow in manure that has little or no oxygen in it. This is the type of environment that infectious and disease bearing bacteria grow, as well as forming a breeding ground for flies, mosquitoes, and the like. The aerobic organisms grow in abundance when oxygen is present, the type of bacteria which grows being a function of whatever environment is present. Accordingly, it has been proposed to pump oxygen in quantity into the manure, such plentiful oxygen causing the aerobic organisms to grow in abundance. When these organisms are in great enough numbers, they will consume and digest the organic material to the point of removing the odors and toxic and noxious gases from the material, making the handling of the manure a more pleasant task.

U.S. Pat. No. 3,840,457, issued Oct. 8, 1974, to G. E. Wilson, discloses, especially in FIGS. 9 through 12 thereof, a method and apparatus for treating animal waste by pumping air through liquid containing waste in order to cause an oxygen transfer that will raise the dissolved oxygen content of the waste while circulating diluting water in a storage area of the material being treated.

Other prior U.S. patents pertinent hereto are U.S. Pat. Nos. 229,955, issued July 13, 1880; 1,937,434, issued Nov.28, 1933; 2,987,186, issued June 6, 1961; 3,882,017, issued May 6, 1975; and 3,926,808, issued Dec. 16, 1975.

SUMMARY OF THE INVENTION

It is an object of the present invention to provide an aeration system for treating solid biological waste in an efficient and reliable manner so as to make the handling of such waste less obnoxious and toxic.

It is another object of the present invention to provide a circulation device for treating solid biological waste, which device is of more efficient and reliable construction when compared to known devices of this kind.

Still another object of the present invention is to provide a circulation device for treating solid biological waste, which device has an improved float assembly for efficiency of operation and reduction of maintenance.

These and other objects are achieved according to the present invention by providing a circulation device for treating solid biological waste, which device has: a duct provided with an inlet and an outlet and immersible in a slurry for forming a fluid flow path through the slurry; a pump arranged in the duct for drawing the slurry through the duct from the inlet to the outlet; and a float connected to the duct for positioning the inlet of the duct adjacent a surface of the slurry in which the duct is immersible.

Advantageously, the pump is in the form of a propeller pump disposed in the duct adjacent the outlet thereof, with the duct adjacent the outlet thereof being arrangeable at the bottom of a tank, and the like, holding the slurry in which the duct is immersed. The duct itself preferably includes a plurality of sections of hollow tubes, and a plurality of flexible couplings, one less of the flexible couplings than there are tubes, with the tubes being articulated to one another by the flexible couplings.

The float assembly preferably includes a pair of buoyant drums, with a cross bar arranged connected to the drums to one another in spaced relation. A connecting arrangement partly on the cross bar and partly on the uppermost one of the tubes forming the duct permits a releasable attachment of the cross bar to the duct in such an orientation that the tube of the duct is disposed between the spaced drums. Advantageously, there are at least two pairs of such drums disposed along the longitudinal extent of the upper portion of the duct.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic, fragmentary, elevational view, partly in vertical section, showing an aeration system for solid biological waste according to the present invention.

FIG. 2 is a top plan view of the circulation device according to the present invention as seen in FIG. 1.

DESCRIPTION OF THE PREFERRED EMBODIMENTS

Figure 3:
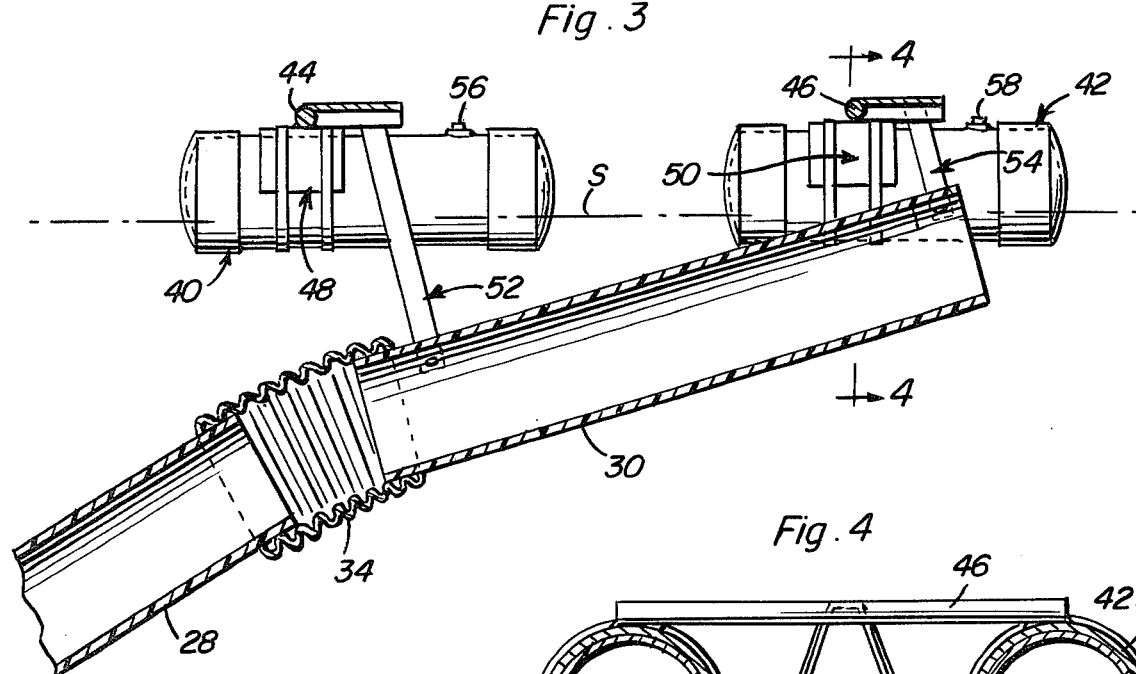
FIG. 3 is an enlarged, fragmentary, sectional view taken generally along the line 3—3 of FIG. 2.
Figure 4:
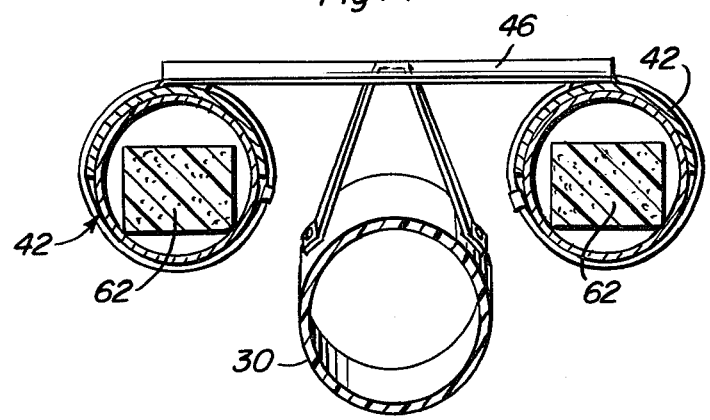
FIG. 4 is an enlarged, sectional view taken generally along the line 4—4 of FIG. 3.
Figure 5:
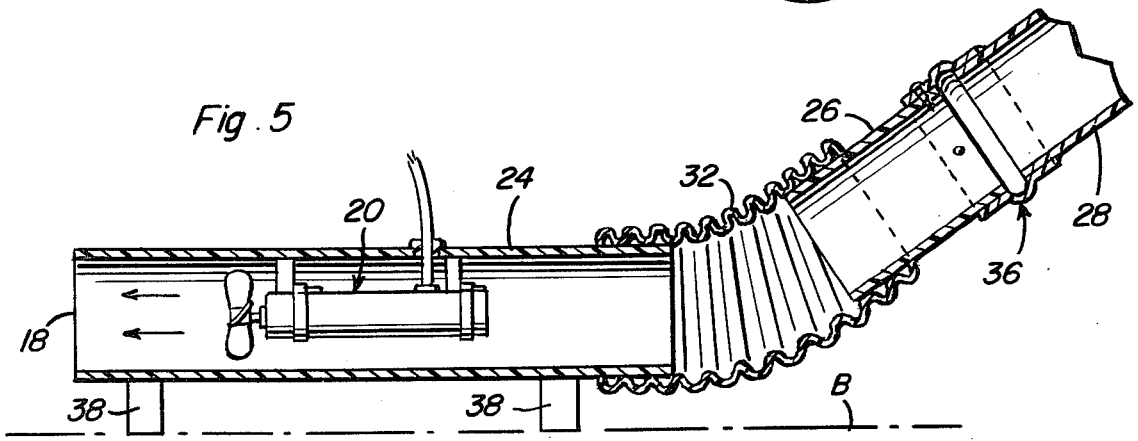
FIG. 5 is an enlarged, fragmentary sectional view taken generally along the line 5—5 of FIG. 2.
Figure 6:
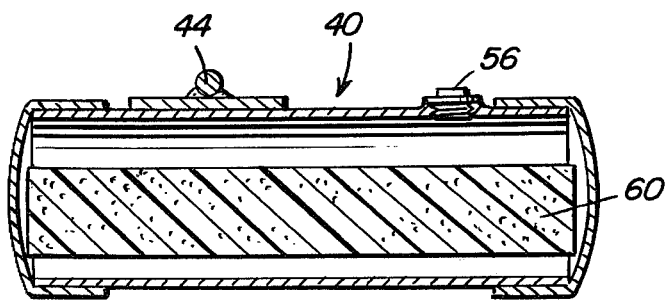
FIG. 6 is an enlarged sectional view taken generally along the line 6—6 of FIG. 2.

Referring now more particularly to the figures of the drawings, an aeration system 10 according to the present invention for treating solid biological waste comprises a circulating device 12 illustrated in FIG. 1 as immersed in a slurry L to be treated, which slurry is held in a tank T of conventional construction and having a bottom B. Device 12 includes a duct 14 having an inlet 16 and an outlet 18 for forming a fluid flow path through the slurry L from the surface S thereof to the bottom B of tank T. A conventional propeller pump 20, and the like, is arranged in duct 14 adjacent outlet 18 for drawing slurry L through duct 14 from inlet 16 to outlet 18, with a float assembly 22 being connected to duct 14 adjacent inlet 16 for positioning inlet 16 at the surface S of slurry L in which duct 14 is immersed.

Duct 14 includes a plurality of sections of hollow tube 24, 26, 28 and 30, and a plurality of flexible couplings 32 and 34, such that there is at least one less of couplings 32, 34 than the tubes forming duct 14, with the tubes 24 and 26, and 28 and 30 being articulated to one another by couplings 32 and 34, respectively. The duct 14 preferably is constructed from conventional length of polyvinyl chloride pipe, with tubes 26 and 28 being connected directly to one another by a bell 36 having self-tapping bolts for quick connection and disconnection of pipes 26 and 28 from one another so as to facilitate cleaning of duct 14.

Tube 24 is supported on bottom B of tank T as by the illustrated diverging legs 38 so as to dispose tube 24 substantially parallel to bottom B of tank T, but slightly spaced thereabove.

Float assembly 22, as illustrated, includes two pairs of drums 40 and 42, each of which pair of drums 40, 42 is connected together by a respective cross bar 44 and 46. Midway in the longitudinal extent of the cross bars 44 and 46 is disposed a respective connector 48 and 50 partially provided on an associated saddle bracket 52, 54 secured to tube 30 of duct 14 so as to permit quick connection and disconnection of the float pairs to the duct 14. The length of duct 14 is as long as necessary to reach from surface S to bottom B, with the combined lengths of the front float drums 40 being as long or longer than tail or tube 28, and the length of the rear float drums 42 being as long or longer than the length of tube 30. Each of the drums 40, 42 is provided with an access opening normally blocked by a plug 56, 58, and has disposed within the hollow interior of the cylindrical drum 40, 42 a block 60, 62 of styrofoam, or other suitable foamed material, to provide flotation. In use, the drums 40, 42 are filled with water by removing the plugs 56 and 58 so as to weight the associated float sufficiently to hold the tail or tube 30 down so that a major portion of inlet 16 is below the surface S of waste L as shown in FIGS. 1 and 3 when surface air and slurry are drawn through the pipe or duct 14. Conventional sewer pipe caps, and the like, can be employed to block the ends of the generally cylindrical drums 40, 42 is a known manner.

The quick couples which form the connectors 48 and 50 can be of any suitable, known construction, commercially available and the couples per se do not form part of the invention herein.

As can be readily understood from the above description and from the drawings, a circulation device according to the present invention can be used in conjunction with a storage tank holding manure, and the like, in order to pump surface air and waste into the body of manure. The oxygen transfer realized when air is pumped through the body of the manure and when the surface waste is drawn adjacent bottom B of tank L, will raise the dissolved oxygen content of the waste. Air is drawn in at surface S through the minimal area of inlet 16 above surface S and discharged adjacent bottom B of tank T due to appropriate action of the propeller pump 20. This air will be broken down into very small bubbles as it passes through the high speed propeller of pump 20 in order to further assist the process.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:
1. An aeration system for treating solid biological wastes, comprising, in combination:
   (1) a storage area having a bottom and arranged for holding a slurry of solids and liquids to be treated; and
   (2) circulating means disposed in the storage area for drawing air and slurry from the surface of the slurry in the storage area and discharging the surface air and slurry into the slurry adjacent the bottom of the storage area, wherein the circulating means consists essentially of:
   (a) a duct means having an inlet and outlet and disposed in the storage area so as to be immersible in the slurry forming a fluid flow path through the slurry, said duct means consisting of a hollow tube means extending from the surface of said slurry to adjacent the bottom of said storage area;
   (b) propeller pump means positioned in the duct means and disposed adjacent said outlet for drawing slurry through the duct means from the inlet to the outlet; and
   (c) float means connected to the duct means adjacent said inlet for positioning the inlet of the duct means adjacent the surface of the slurry so that a major portion of said inlet is immersed in said slurry.
2. The aeration system as defined in claim 1, wherein the hollow tube means includes a plurality of sections of hollow tubes and a plurality of flexible couplings, the tubes being aritculated to one another by the flexible couplings.
3. The aeration system as defined in claim 2 wherein said float means includes a pair of buoyant drums, with a cross bar connecting the drums to one another in spaced relation, a block of foamed material disposed in each of said drums, and plug means provided in each of the drums for permitting the drums to be filled with a fluid heavier than air for holding the drums at a predetermined level in the slurry as the slurry and air is being drawn through the duct means, the pair of drums being disposed on the duct means such that the duct means is disposed between the drums of the pair.
4. The aeration system of claim 1 wherein said storage area is a tank containing the biological wastes.
5. The aeration system as defined in claim 1 including duct support means positioned on the bottom of said storage area adjacent the outlet of said duct, said support means holding said outlet adjacent the bottom of said storage area.

* * * * *